(12) United States Patent
Chen et al.

(10) Patent No.: US 11,921,411 B2
(45) Date of Patent: Mar. 5, 2024

(54) WAVELENGTH CONVERSION ELEMENT AND PROJECTION DEVICE

(71) Applicant: Coretronic Corporation, Hsin-Chu (TW)

(72) Inventors: I-Hua Chen, Hsin-Chu (TW); Chi-Tang Hsieh, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/711,058

(22) Filed: Apr. 1, 2022

(65) Prior Publication Data

US 2022/0326592 A1 Oct. 13, 2022

(30) Foreign Application Priority Data

Apr. 7, 2021 (CN) .......................... 202110370373.8

(51) Int. Cl.
*G03B 21/20* (2006.01)
*G02B 26/00* (2006.01)
*G03B 21/16* (2006.01)

(52) U.S. Cl.
CPC ......... *G03B 21/206* (2013.01); *G02B 26/008* (2013.01); *G03B 21/16* (2013.01); *G03B 21/204* (2013.01)

(58) Field of Classification Search
CPC .... G03B 21/206; G03B 21/16; G03B 21/204; G02B 26/008
See application file for complete search history.

(56) References Cited

U.S. PATENT DOCUMENTS

| 10,401,718 B2 * | 9/2019 | Egawa ................. G03B 21/16 |
| 2016/0077325 A1 | 3/2016 | Tsai et al. |
| 2016/0291315 A1 | 10/2016 | Hsu |
| 2017/0099467 A1 | 4/2017 | Egawa |

(Continued)

FOREIGN PATENT DOCUMENTS

| CN | 1797181 A | 7/2006 |
| CN | 205091534 U | 3/2016 |

(Continued)

OTHER PUBLICATIONS

First Office Action in counterpart China Application No. 202110370373.8, dated Dec. 5, 2023.

*Primary Examiner* — Magda Cruz

(57) ABSTRACT

A wavelength conversion element includes a substrate, a wavelength conversion layer and a heat dissipation member. The substrate has a supporting surface. The wavelength conversion layer is disposed on the supporting surface. The heat dissipation member is disposed on the supporting surface and is surrounded by the wavelength conversion layer. The heat dissipation member has a heat dissipation plate and a plurality of heat dissipation tooth portions. The heat dissipation plate is fixed on the supporting surface. The heat dissipation plate has an outer side surface. The outer side surface is perpendicular to the supporting surface. The heat dissipation tooth portions are respectively connected to the outer side surface. A projection device including the wavelength conversion element is also provided. The wavelength conversion element can improve wavelength conversion efficiency and reliability, and the projection device can improve image brightness and service life.

20 Claims, 17 Drawing Sheets

(56) References Cited

U.S. PATENT DOCUMENTS

| | | | |
|---|---|---|---|
| 2018/0031957 A1* | 2/2018 | Egawa | H04N 9/3158 |
| 2020/0278599 A1* | 9/2020 | Takasawa | F21V 7/22 |
| 2020/0310233 A1* | 10/2020 | Kadotani | H05K 7/20309 |
| 2021/0096356 A1* | 4/2021 | Chang | G03B 21/16 |
| 2021/0286165 A1* | 9/2021 | Asano | H04N 5/74 |

FOREIGN PATENT DOCUMENTS

| | | | | |
|---|---|---|---|---|
| CN | 208834086 U | | 5/2019 | |
| CN | 110764352 A | | 2/2020 | |
| CN | 210605321 U | | 5/2020 | |
| CN | 211289978 U | | 8/2020 | |
| CN | 211293572 U | | 8/2020 | |
| CN | 212749383 U | | 3/2021 | |
| CN | 216526711 U | * | 5/2022 | G03B 21/16 |
| TW | 200916938 A | | 4/2009 | |

* cited by examiner

WAVELENGTH CONVERSION ELEMENT AND PROJECTION DEVICE

CROSS-REFERENCE TO RELATED APPLICATION

This application claims the priority benefit of China application serial no. 202110370373.8, filed on Apr. 7, 2021. The entirety of the above-mentioned patent application is hereby incorporated by reference herein and made a part of this specification.

FIELD OF THE INVENTION

The invention relates to an optical element and a display device, and more particularly to a wavelength conversion element and a projection device including the wavelength conversion element.

BACKGROUND OF THE INVENTION

With the market's requirements for the brightness, color saturation, service life, non-toxic and environmental protection of projection devices, etc, the types of light sources used in projection devices have evolved from ultra-high pressure mercury lamps (UHP lamps), light emitting diodes (LEDs) to laser diodes (LDs).

The projection device using the laser diodes converts the excitation beam provided by the laser diodes into a converted beam by means of a fluorescent color wheel. The existing fluorescent color wheel mainly includes a substrate, a fluorescent layer, a motor and a clamping ring. The clamping ring presses the substrate against the motor, and the fluorescent layer is disposed on the substrate. Generally speaking, when the projection device is operating, the temperature of the phosphor layer will rise due to continuous exposure to the excitation beam. Therefore, in order to dissipate heat from the phosphor layer, the substrate is usually made of a material with good thermal conductivity.

However, due to the limited heat dissipation capacity of the substrate, the existing fluorescent color wheel still has the problem of low heat dissipation efficiency. The low heat dissipation efficiency of the fluorescent color wheel will not only lead to a decrease in wavelength conversion efficiency, but also cause deterioration of the adhesive layer adhered between the substrate, the clamping ring and the motor, resulting in poor viscosity. In turn, the service life of the fluorescent color wheel is reduced.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a wavelength conversion element to improve wavelength conversion efficiency and reliability.

The invention provides a projection device to improve image brightness and prolong service life.

Other advantages and objects of the invention may be further illustrated by the technical features broadly embodied and described as follows.

In order to achieve one or part or all of the above-mentioned purposes or other purposes, the wavelength conversion element provided by the invention includes a substrate, a wavelength conversion layer and a heat dissipation member. The substrate has a supporting surface. The wavelength conversion layer is disposed on the supporting surface. The heat dissipation member is disposed on the supporting surface and is surrounded by the wavelength conversion layer. The heat dissipation member has a heat dissipation plate and a plurality of heat dissipation tooth portions. The heat dissipation plate is fixed on the supporting surface. The heat dissipation plate has an outer side surface. The outer side surface is perpendicular to the supporting surface. The heat dissipation tooth portions are respectively connected to the outer side surface.

In order to achieve one or part or all of the above-mentioned purposes or other purposes, the projection device provided by the invention includes an illumination system, a light valve and a projection lens. The illumination system is used to provide an illumination beam. The light valve is disposed on a transmission path of the illumination beam to convert the illumination beam into an image beam. The projection lens is disposed on a transmission path of the image beam to project the image beam. The illumination system includes an excitation light source and the aforementioned wavelength conversion element. The excitation light source is used to provide an excitation beam. The wavelength conversion element is disposed on a transmission path of the excitation beam. The wavelength conversion layer is used to convert the excitation beam into a converted beam, and the illumination beam includes the converted beam.

In the invention, the wavelength conversion element adopts a heat dissipation member including a heat dissipation plate and a plurality of heat dissipation tooth portions. The heat dissipation plate can clamp and fix the substrate, the heat dissipation tooth portions can disturb the surrounding airflow when the wavelength conversion element rotates and then quickly dissipate the heat of the substrate and the wavelength conversion layer. Therefore, the heat dissipation member of the invention can effectively improve the heat dissipation efficiency of the wavelength conversion element, and further improve the wavelength conversion efficiency and reliability of the wavelength conversion element. In addition, the projection device of the invention has improved image brightness and service life due to the use of the above-mentioned wavelength conversion element.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1A:
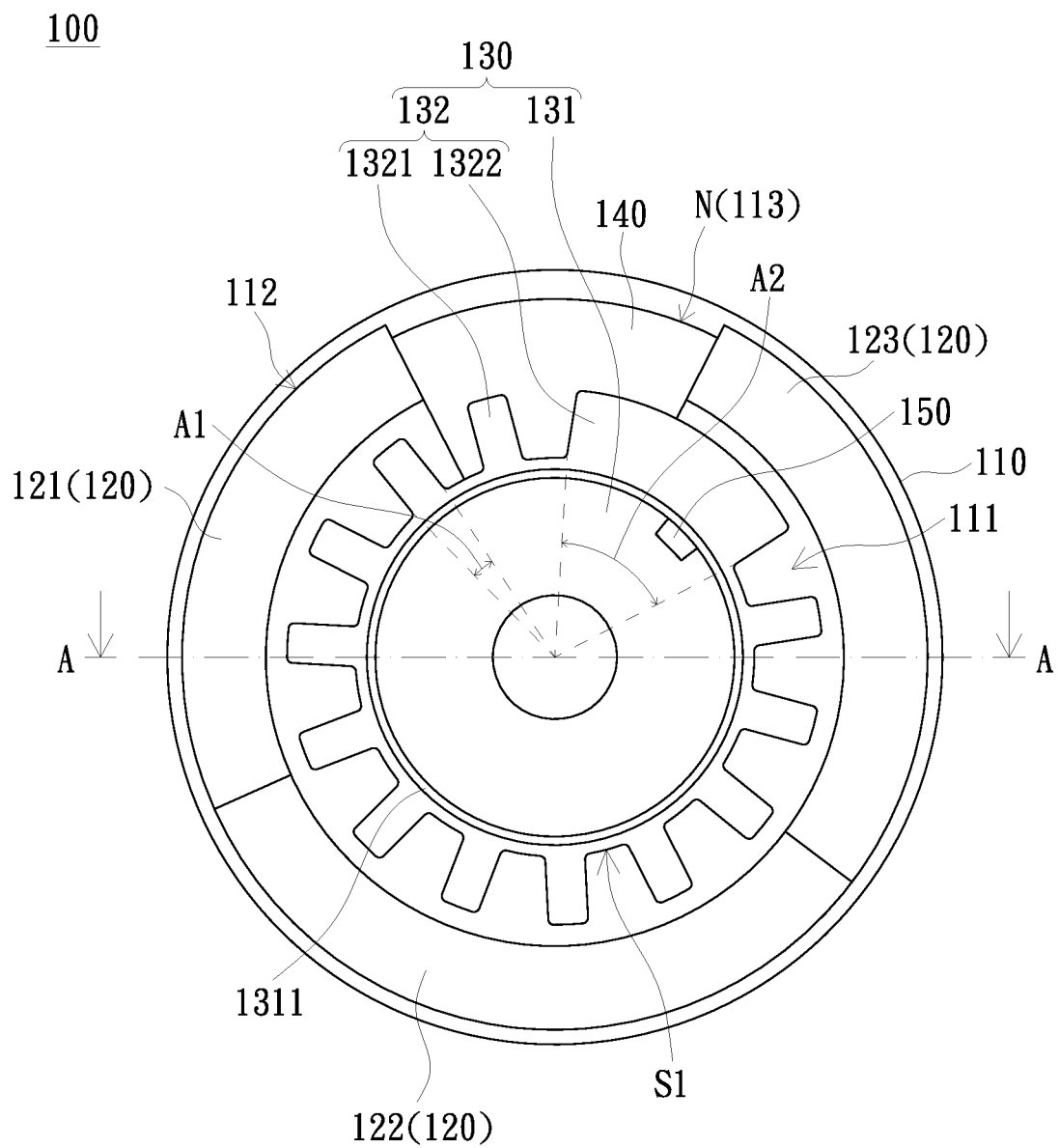
FIG. 1A is a schematic top view of a wavelength conversion element according to an embodiment of the invention.
Figure 1B:
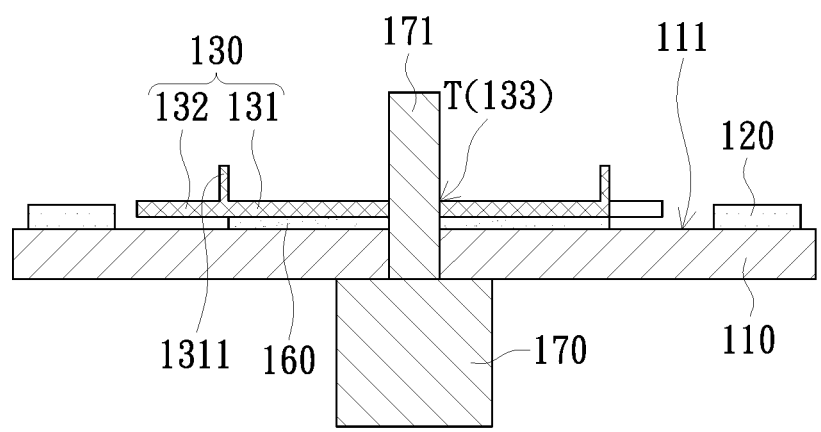
FIG. 1B is a schematic cross-sectional view of the wavelength conversion element, taken along the line A-A in FIG. 1.
Figure 2:
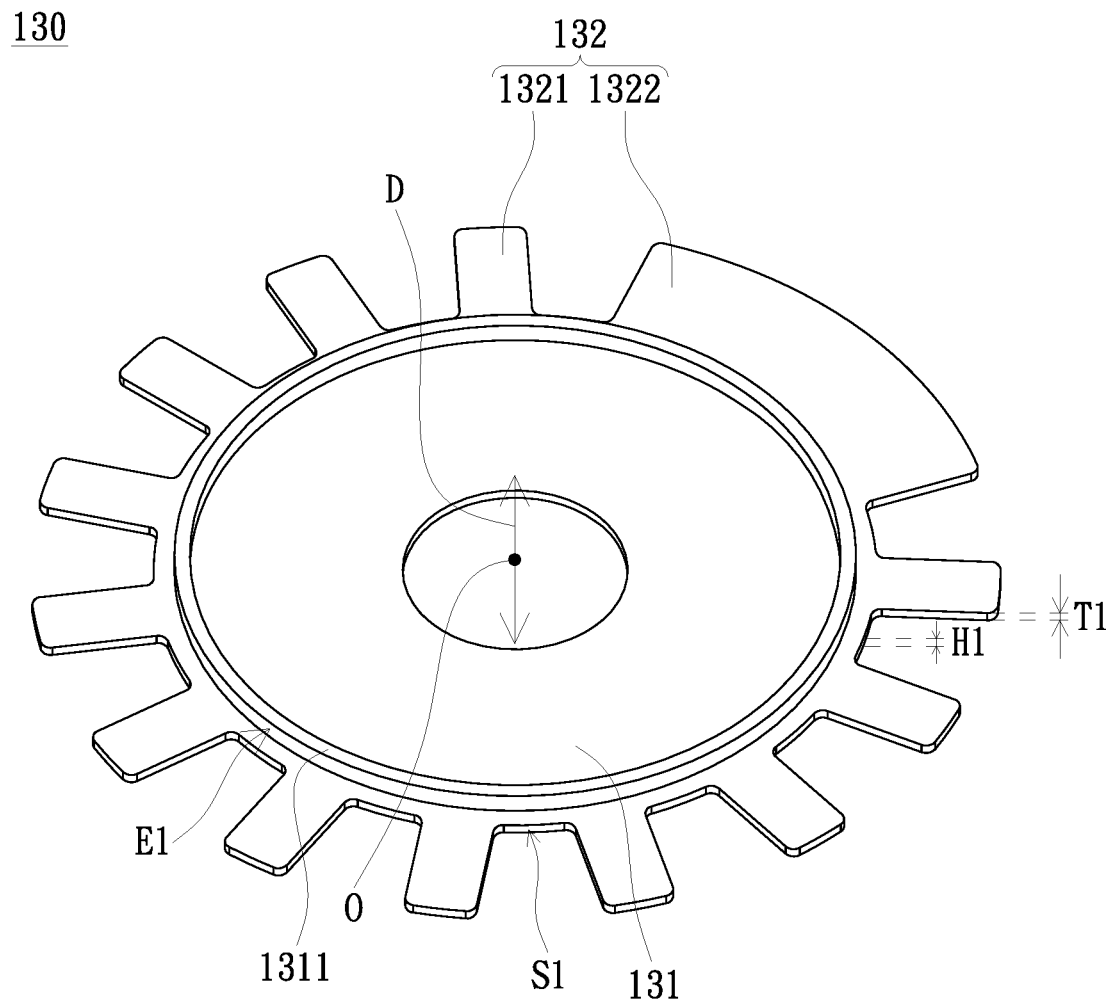
FIG. 2 is a schematic three-dimensional view of a heat dissipation member in FIG. 1.

FIG. 1A is a schematic top view of a wavelength conversion element according to an embodiment of the invention. FIG. 1B is a schematic cross-sectional view of the wavelength conversion element, taken along the line A-A in FIG. 1A. FIG. 2 is a schematic three-dimensional view of a heat dissipation member in FIG. 1. Please refer to FIGS. 1A, 1B and 2. The wavelength conversion element 100 includes a substrate 110, a wavelength conversion layer 120 and a heat dissipation member 130. The substrate 110 has a supporting surface 111. The wavelength conversion layer 120 is disposed on the supporting surface 111. The heat dissipation member 130 is disposed on the supporting surface 111 and is surrounded by the wavelength conversion layer 120. The heat dissipation member 130 has a heat dissipation plate 131 and a plurality of heat dissipation tooth portions 132. The heat dissipation plate 131 is fixed on the supporting surface 111. The heat dissipation plate 131 has an outer side surface S1 perpendicular to the supporting surface 111. The heat dissipation tooth portions 132 are respectively connected to the outer side surface S1.

Please continue to refer to FIG. 1A. The material of the substrate 110 may include metals (e.g., aluminum, copper, silver) or other materials (e.g., ceramics) with high temperature resistance and high thermal conductivity, but is not limited thereto. The shape of the substrate 110 may be a ring, but the invention does not limit the specific shape of the substrate 110. In addition, the substrate 110 may have adjacent wavelength conversion zone 112 and wavelength maintenance zone 113. The wavelength conversion zone 112 and the wavelength maintenance zone 113 may be arranged along a circular track. The wavelength conversion layer 120 is disposed in the wavelength conversion zone 112, and the characteristics of the wavelength conversion layer 120 will be described in subsequent paragraphs.

The wavelength maintenance zone 113 of the substrate 110 does not change the wavelength of the excitation beam. For example, the wavelength maintenance zone 113 may include an opening N to allow the excitation beam to pass therethrough. In addition, the wavelength conversion element 100 may further include a light-transmitting plate 140 disposed in the opening N. The shape of the light-transmitting plate 140 may correspond to the opening N, for example, having a shape that the light-transmitting plate 140 can be disposed in the opening N. In detail, the light-transmitting plate 140 of this embodiment may be a glass substrate for allowing the excitation beam to pass therethrough. In addition, the light-transmitting plate 140 may have a light diffusion layer or a light diffusion microstructure to reduce the speckle. In another embodiment, the light-transmitting plate 140 is, for example, anti-reflection glass (AR glass) to improve light utilization. In addition, according to different design requirements, the wavelength maintenance zone 113 may be a reflective zone capable of reflecting the excitation beam. In this case, the wavelength maintenance zone 113 of the substrate 110 may not have the opening N, and the wavelength maintenance zone 113 may be provided with a reflective layer to improve reflectivity.

The wavelength conversion zone 112 is used to convert the wavelength of the excitation beam. Specifically, the wavelength conversion layer 120 disposed in the wavelength conversion zone 112 may include at least one wavelength conversion block, wherein this embodiment takes three wavelength conversion blocks 121, 122 and 123 with different emission wavelengths as an example. For example, the wavelength conversion block 121 may emit green light after being irradiated by the excitation beam. The wavelength conversion block 122 may emit yellow light after being irradiated by the excitation beam. The wavelength conversion block 123 may emit red light after being irradiated by the excitation beam. It can be understood that the number of the aforementioned wavelength conversion blocks is not limited to three. In other embodiments, the number of the aforementioned wavelength conversion blocks may be one, two or more than three. In this embodiment, the wavelength conversion material provided on the wavelength conversion layer 120 includes, for example, a fluorescent material, a phosphorescent material (e.g., a phosphor), or a nano material (e.g., a quantum dot).

Please refer to FIG. 1B again. In this embodiment, the wavelength conversion element 100 may be configured as a wavelength conversion wheel. Therefore, the wavelength conversion element 100 may further include a motor 170. The motor 170 has a rotating shaft 171 for driving the substrate 110 to rotate. The substrate 110 can be fixed to the motor 170 by pasting or other methods. For example, the wavelength conversion element 100 may further include an adhesive layer 160 disposed at least between the substrate 110 and the heat dissipation plate 131. In this embodiment, the adhesive layer 160 is, for example, provided between the substrate 110 and the heat dissipation plate 131, but does not extend between the substrate 110 and the heat dissipation tooth portion 132. The heat dissipation plate 131 of the heat dissipation member 130 is, for example, sleeved on the rotating shaft 171 to clamp the substrate 110 with the motor 170. Furthermore, the heat dissipation member 130 of this embodiment may have a shaft hole 133. The shaft hole 133 is, for example, a through hole T for allowing the rotating shaft 171 to pass therethrough.

Please refer to FIG. 2 again. The shape of the heat dissipation plate 131 is, for example, a ring shape for rotation. In other words, the outer side surface S1 of the heat dissipation plate 131 has a ring shape, for example. The heat dissipation tooth portions 132 may respectively extend from the outer side surface S1 in the radial direction of the heat dissipation plate 131. In this way, the heat dissipation tooth portions 132 can disturb the surrounding airflow when the wavelength conversion element 100 rotates, and then quickly dissipate the heat of the substrate 110 and the wavelength conversion layer 120 (both labeled in FIG. 1A).

Please refer to FIGS. 1A and 2 again. Incidentally, the heat dissipation plate 131 may have an annular side wall 1311 protruding in a direction away from the supporting surface 111. As shown in FIG. 2, the outer ring surface E1 of the annular side wall 1311 is located at the inner side of the outer side surface S1 of the heat dissipation plate 131. In other words, in the radial direction of the heat dissipation plate 131, the outer side surface S1 is farther away from the center O of the heat dissipation plate 131 than the outer ring surface E1. In addition, each heat dissipation tooth portion 132 may have a maximum thickness T1 in the axial direction D of the heat dissipation plate 131, and the maximum thickness T1 may be 0.3 mm to 1.0 mm, but is not limited thereto. For example, the maximum thickness T1 may be 0.3 mm to 0.6 mm. In this embodiment, the aforementioned maximum thickness T1 may be approximately equal to the height H1 of the outer side surface S1 in the axial direction D.

In this embodiment, the material of the heat dissipation member 130 may include metal or ceramic. The metal may include aluminum, aluminum alloy, copper, copper alloy, or stainless steel, but the invention is not limited thereto. On the other hand, the ceramic may include aluminum oxide, aluminum nitride, or silicon carbide, but the invention is not limited thereto.

Compared with the clamping ring used to fix the substrate in the prior art, the heat dissipation member 130 of the wavelength conversion element 100 of this embodiment not only can clamp and fix the substrate 110, but also the heat dissipation tooth portions 132 of the heat dissipation member 130 can disturb the surrounding air flow when the wavelength conversion element 100 rotates, thereby quickly dissipating the heat of the substrate 110 and the wavelength conversion layer 120. Therefore, compared with the prior art, the wavelength conversion element 100 of this embodiment has higher heat dissipation efficiency, so the wavelength conversion element 100 of this embodiment has higher wavelength conversion efficiency and reliability. In addition, because the adhesive layer 160 of this embodiment does not extend between the substrate 110 and the heat dissipation tooth portion 132, a gap is formed between the substrate 110 and the heat dissipation tooth portion 132 to increase the turbulence effect when the wavelength conversion element 100 rotates, thereby improving the heat dissipation efficiency.

It is worth mentioning that the heat dissipating tooth portion 132 of the heat dissipating element 130 can be designed in different configurations to adjust the dynamic balance of the wavelength conversion element 100. As shown in FIGS. 1A and 2, the heat dissipation tooth portion 132 may include a plurality of first heat dissipation tooth portions 1321 and a second heat dissipation tooth portion 1322. Each first heat dissipation tooth portion 1321 occupies the first central angle A1 (labeled in FIG. 1A) of the outer side surface S1. The second heat dissipation tooth portion 1322 occupies the second central angle A2 (labeled in FIG. 1A) of the outer side surface S1. The second central angle A2 is greater than the first central angle A1. In this way, the weight of the second heat dissipation tooth portion 1322 is greater than the weight of the single first heat dissipation tooth portion 1321, so as to improve the dynamic balance of the wavelength conversion element 100.

In this embodiment, the second heat dissipation tooth portion 1322 may correspond to a part of the wavelength conversion zone 112 and a part of the wavelength maintenance zone 113. For example, the position of the second heat dissipation tooth portion 1322 extending in the radial direction of the heat dissipation plate 131 may correspond to a part of the wavelength maintenance zone 113, and the position of the second heat dissipation tooth portion 1322 is closer to the wavelength conversion block 123 than the wavelength maintenance zone 113. Specifically, the wavelength conversion blocks 121, 122 and 123 may respectively include green phosphor, yellow phosphor and red phosphor. The density of the green phosphor is greater than that of the yellow phosphor and that of the red phosphor, so that the weight of the wavelength conversion block 121 is greater than the weight of the wavelength conversion block 122 and the weight of the wavelength conversion block 123, and the weight of the wavelength maintenance zone 113 is also different from the weight of the wavelength conversion zone 112. Therefore, the position of the second heat dissipation tooth portion 1322 corresponds to a part of the wavelength maintenance zone 113 in the radial direction of the heat dissipation plate 131 and is closer to the wavelength conversion block 123, which can improve the dynamic balance of the wavelength conversion element 100. It can be understood that, in other embodiments, the position, central angle and number of the second heat dissipation tooth portion 1322 can be adjusted according to the weight distribution of the wavelength conversion zone 112, the wavelength conversion layer 120 and the wavelength maintenance zone 113.

Incidentally, other means or methods can be combined to further improve the dynamic balance if the second heat dissipation tooth portion 1322 is still insufficient to achieve the desired dynamic balance of the wavelength conversion element 100. For example, the wavelength conversion element 100 may further include a counterweight member 150, which is disposed on the heat dissipation plate 131 for example, to further improve the overall dynamic balance of the wavelength conversion element 100. Because the second heat dissipation tooth portion 1322 of the heat dissipation member 130 can adjust the dynamic balance of the wavelength conversion element 100, the weight of the counterweight member 150 of this embodiment can be reduced. It can be understood that, in other embodiments, the counterweight member 150 may not be provided if the wavelength conversion element 100 can achieve an ideal dynamic balance when the heat dissipation member 130 with the second heat dissipation tooth portion 1322 is provided. In addition, in an embodiment, the dynamic balance may be improved by only using the counterweight member 150 without the second heat dissipating tooth portion 1322.

Figure 3:
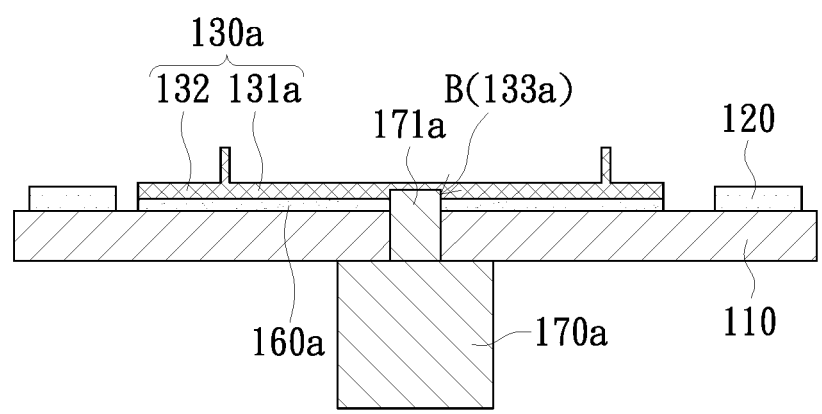
FIG. 3 is a schematic cross-sectional view of a wavelength conversion element according to another embodiment of the invention.

FIG. 3 is a schematic cross-sectional view of a wavelength conversion element according to another embodiment of the invention. As shown in FIG. 3, compared with the embodiment of FIG. 1B, the adhesive layer 160a of the wavelength conversion element 100a can extend from the heat dissipation plate 131a to between the substrate 110 and the heat dissipation tooth portion 132 to improve the fixation of the heat dissipation member 130a to the substrate 110. On the other hand, the shaft hole 133a of the heat dissipation member 130a may be a blind hole B, and the heat dissipation member 130a may be fixed to the rotating shaft 171a of the motor 170a by pasting or other means. Incidentally, the heat dissipation member 130 in FIG. 1B can be replaced with the heat dissipation member 130a of this embodiment.

Figure 4:
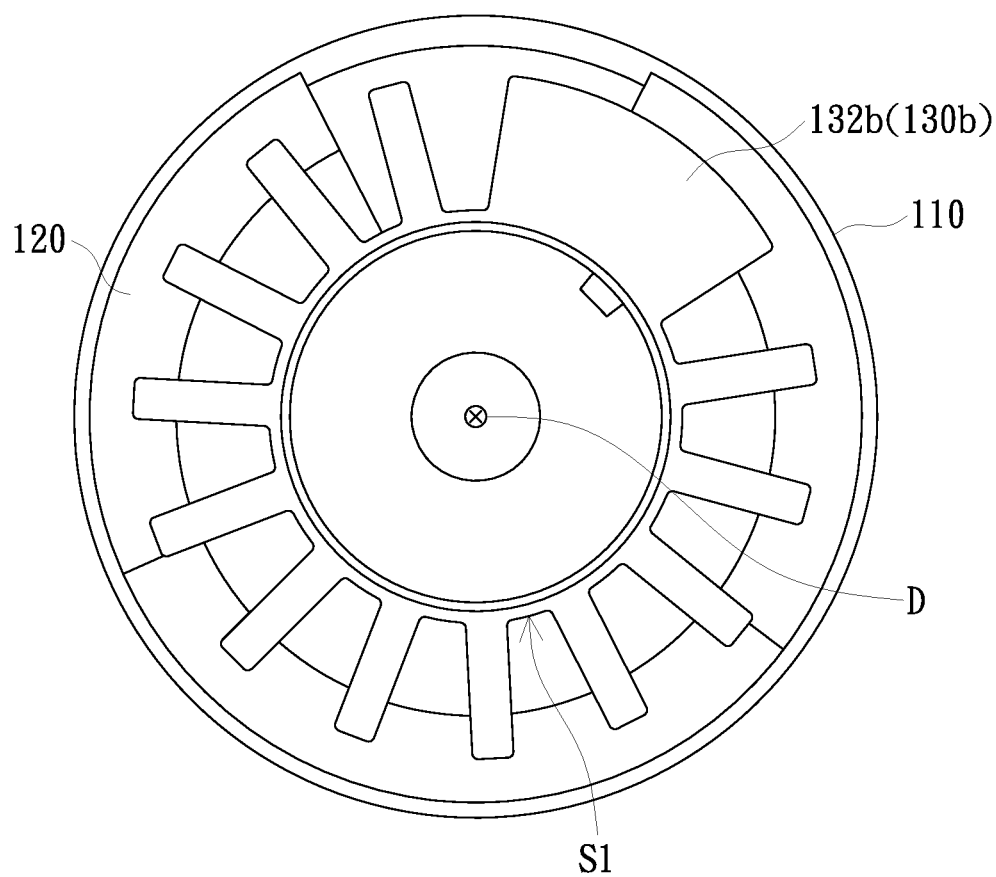
FIG. 4 is a schematic top view of a wavelength conversion element according to another embodiment of the invention.

FIG. 4 is a schematic top view of a wavelength conversion element according to another embodiment of the invention. As shown in FIG. 4, the wavelength conversion element 100b of this embodiment is similar to the wavelength conversion element 100. The main difference is that, in the heat dissipation member 130b of this embodiment, at least a part of the side of the heat dissipation teeth portion 132b away from the outer side surface S1 may overlap a part of the wavelength conversion layer 120. Specifically, the orthographic projection of the side of the heat dissipation teeth portion 132b away from the outer side surface S1 in the axial direction D on the substrate 110 partially overlaps the orthographic projection of the wavelength conversion layer 120 on the substrate 110 in the axial direction D. FIG. 4 is an example where the side of all the heat dissipation teeth portions 132b away from the outer side surface S1 is overlapped with a part of the wavelength conversion layer 120 as an example. In detail, a part of each heat dissipation teeth portion 132b may overlap the area of the wavelength conversion layer 120 that is not irradiated by the excitation beam. In this way, the heat dissipation tooth portion 132b can also provide the function of fixing the wavelength conversion layer 120.

Figure 5:
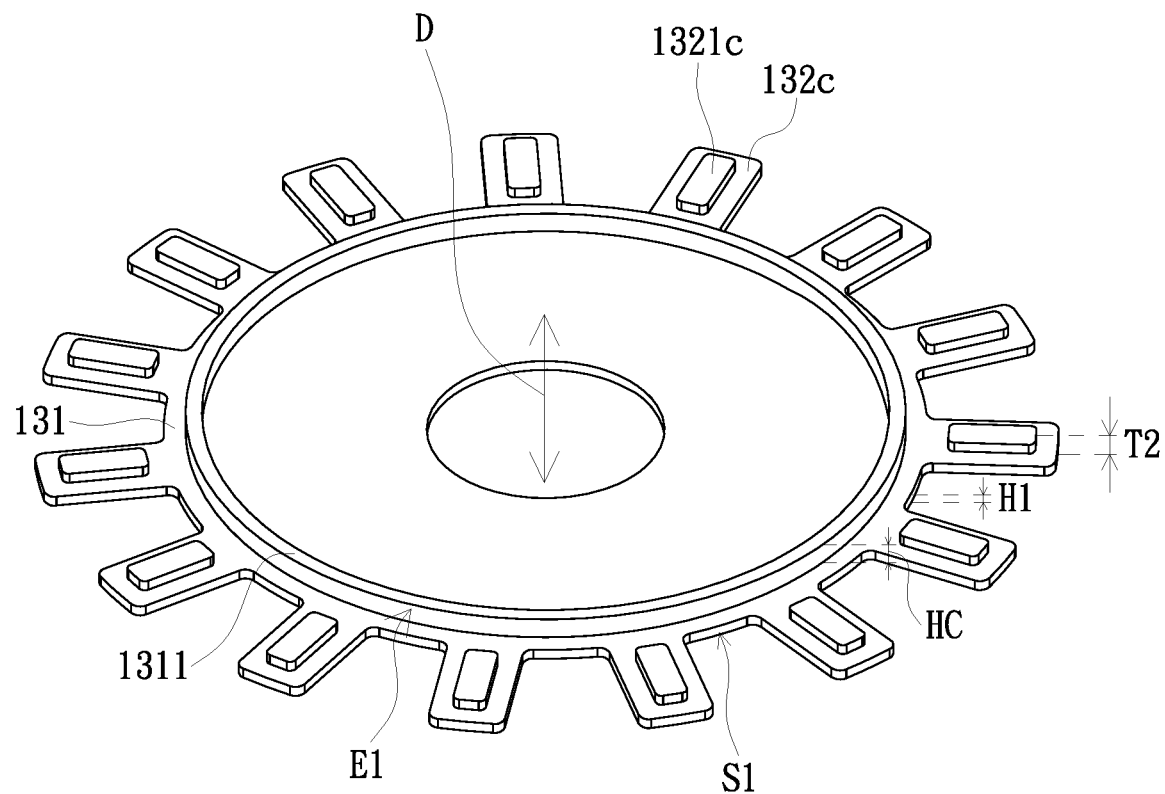
FIG. 5 is a schematic three-dimensional view of a heat dissipation member of a wavelength conversion element according to another embodiment of the invention.

FIG. 5 is a schematic three-dimensional view of a heat dissipation member of a wavelength conversion element according to another embodiment of the invention. As shown in FIG. 5, the structure and advantages of the heat dissipation member 130c of the wavelength conversion element of this embodiment are similar to those of the previous embodiments. The main difference is that each heat dissipation tooth portion 132c may have a spoiler structure 1321c protruding in the axial direction D of the heat dissipation plate 131. In this way, the spoiler structure 1321c can increase the disturbance of the air flow when the heat dissipation member 130c rotates, so as to further improve the heat dissipation efficiency. It can be understood that the shape of the spoiler structure 1321c is not limited to the shape shown in FIG. 5, and the number of the spoiler structure 1321c of each heat dissipation tooth portion 132c may also be different from that in FIG. 5. The invention does not limit the detailed features of the spoiler structure 1321c.

Incidentally, similar to the embodiment of FIG. 1A, the outer ring surface E1 of the annular side wall 1311 of this embodiment can be located at the inner side of the outer side surface S1 of the heat dissipation plate 131. On the other hand, the maximum thickness T2 of each heat dissipation tooth portion 132c in the axial direction D may be greater than the height H1 of the outer side surface S1 in the axial direction D. In addition, the maximum thickness T2 is also smaller than the height HC of the annular side wall 1311 in the axial direction D. The maximum thickness T2 may be 0.3 mm to 1.0 mm, but is not limited thereto.

Figure 6:
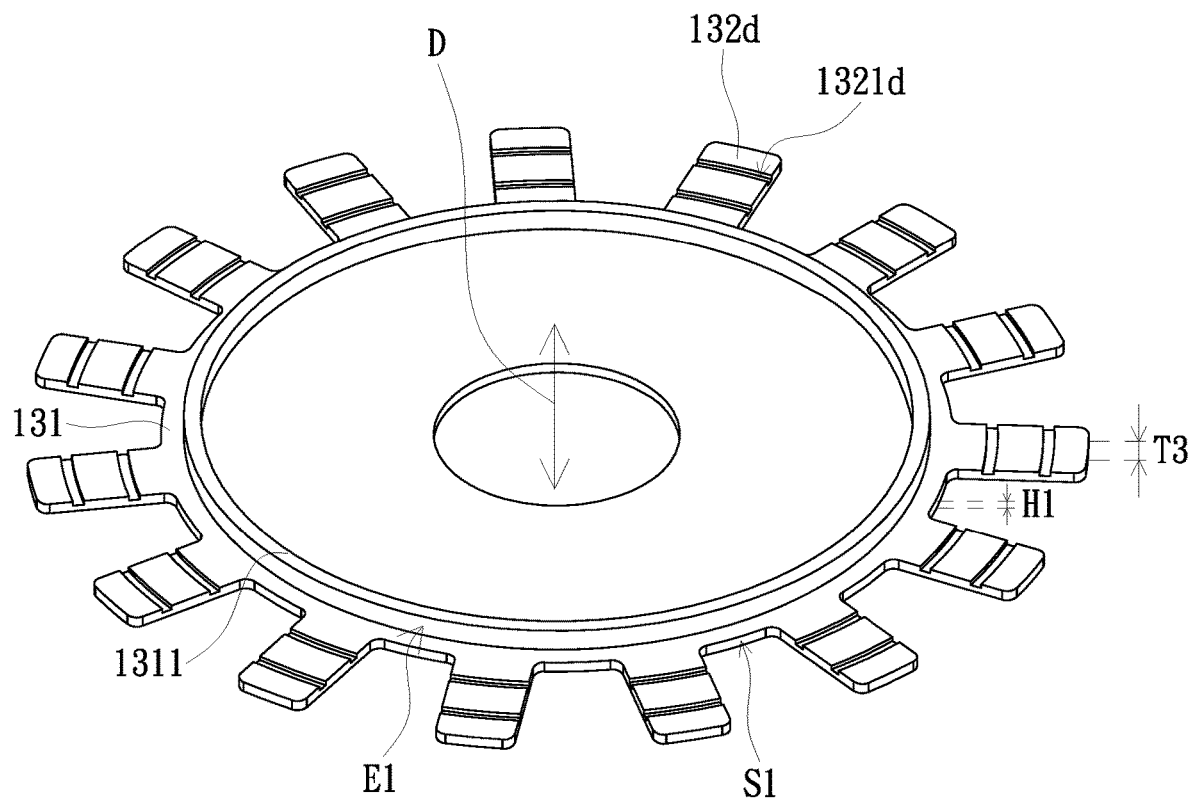
FIG. 6 is a schematic three-dimensional view of a heat dissipation member of a wavelength conversion element according to another embodiment of the invention.

FIG. 6 is a schematic three-dimensional view of a heat dissipation member of a wavelength conversion element according to another embodiment of the invention. Please refer to FIG. 6. Similar to the embodiment of FIG. 5, the heat dissipation tooth portion 132d of the heat dissipation member 130b of this embodiment may also have a spoiler structure 1321d. However, the spoiler structure 1321d of this embodiment is recessed in the axial direction D of the heat dissipation plate. Similarly, the shape of the spoiler structure 1321d is not limited to the shape shown in FIG. 6, and the number of the spoiler structure 1321d of each heat dissipation tooth portion 132d may also be different from that in FIG. 6. The invention does not limit the detailed features of the spoiler structure 1321d.

Similar to the previous embodiments, the outer ring surface E1 of the annular side wall 1311 of this embodiment can be located at the inner side of the outer side surface S1 of the heat dissipation plate 131. On the other hand, the maximum thickness T3 of each heat dissipation tooth portion 132d in the axial direction D is equal to the height H1 of the outer side surface S1 in the axial direction D, for example. The maximum thickness T3 may be 0.3 mm to 1.0 mm, but is not limited thereto.

Figure 7:
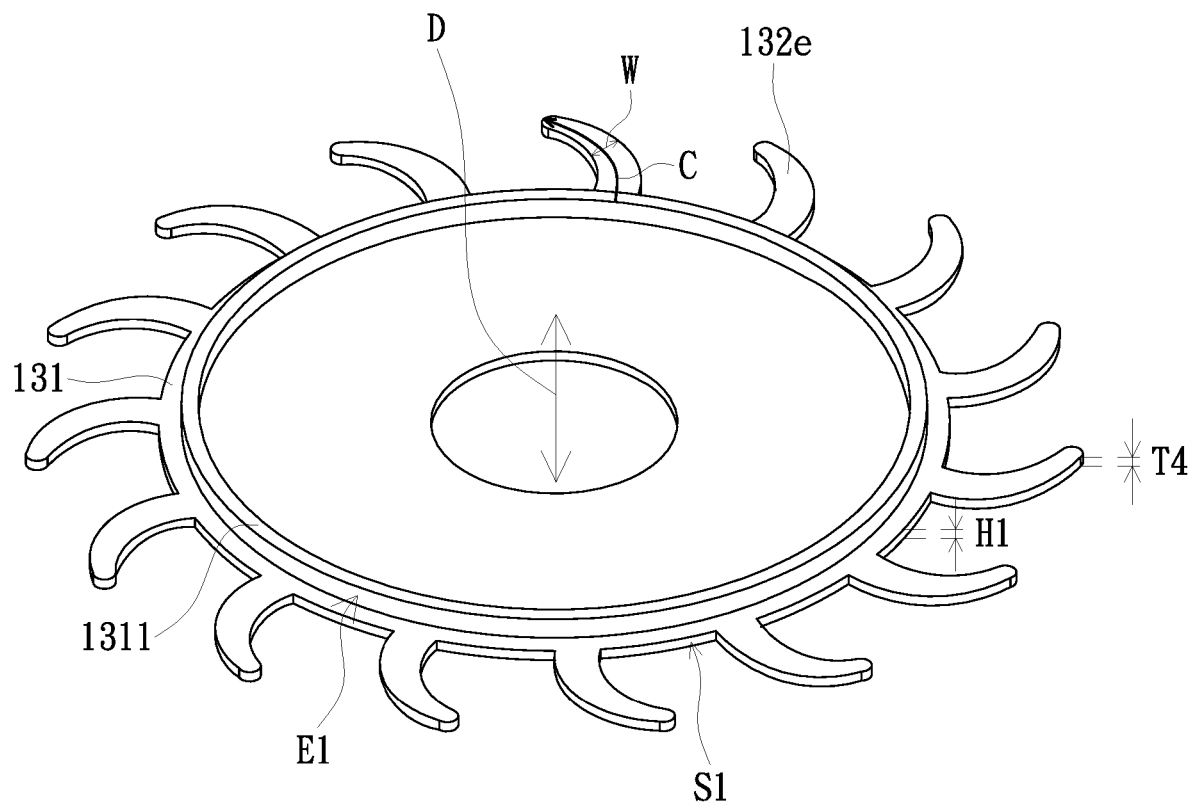
FIG. 7 is a schematic three-dimensional view of a heat dissipation member of a wavelength conversion element according to another embodiment of the invention.

FIG. 7 is a schematic three-dimensional view of a heat dissipation member of a wavelength conversion element according to another embodiment of the invention. Please refer to FIG. 7. In this embodiment, the structure and advantages of the heat dissipation member 130e of the wavelength conversion element are similar to those in the previous embodiments. The main difference is that the heat dissipation tooth portion 132e of this embodiment is meniscus-shaped. For example, each heat dissipation tooth portion 132e may extend in a direction away from the outer side surface S1 of the heat dissipation plate 131, and may be curved relative to the radial direction of the heat dissipation plate 131 to form an arc. Furthermore, each heat dissipation tooth portion 132e extends along the bending direction C, each heat dissipation tooth portion 132e may have a width W in a direction perpendicular to the bending direction C, and the width W tapers away from the outer side surface S1 for example. Incidentally, the bending direction C of the heat dissipation tooth portion 132e can be adjusted according to the rotation direction of the wavelength conversion element of this embodiment.

In addition, similar to the previous embodiments, the outer ring surface E1 of the annular side wall 1311 of this embodiment can be located at the inner side of the outer side surface S1 of the heat dissipation plate 131. On the other hand, in this embodiment, the maximum thickness T4 of each heat dissipation tooth portion 132e in the axial direction D is, for example, equal to the height H1 of the outer side surface S1 in the axial direction D. The maximum thickness T4 is, for example, 0.3 mm to 1.0 mm, but is not limited thereto.

Figure 8A:
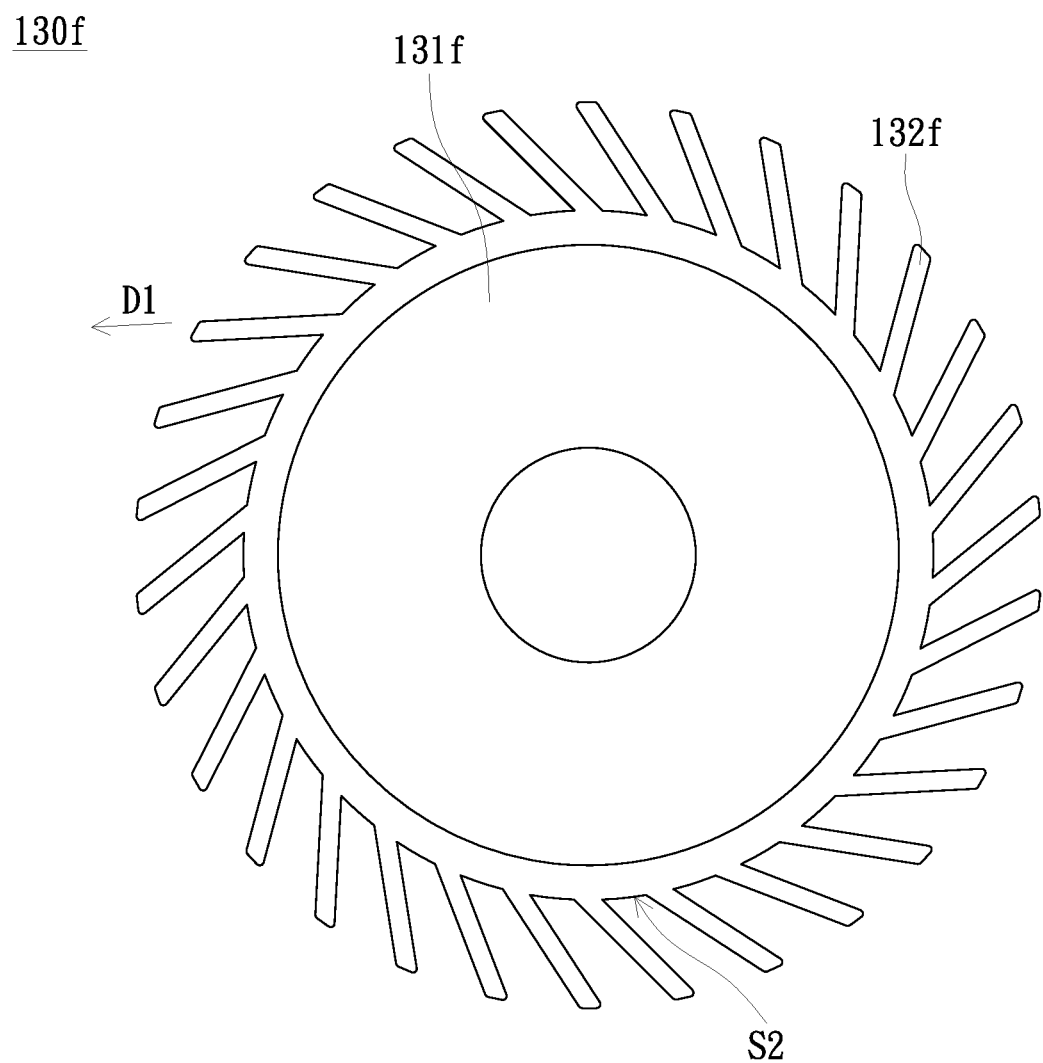
FIG. 8A is a schematic top view of a heat dissipation member of a wavelength conversion element according to another embodiment of the invention.
Figure 8B:
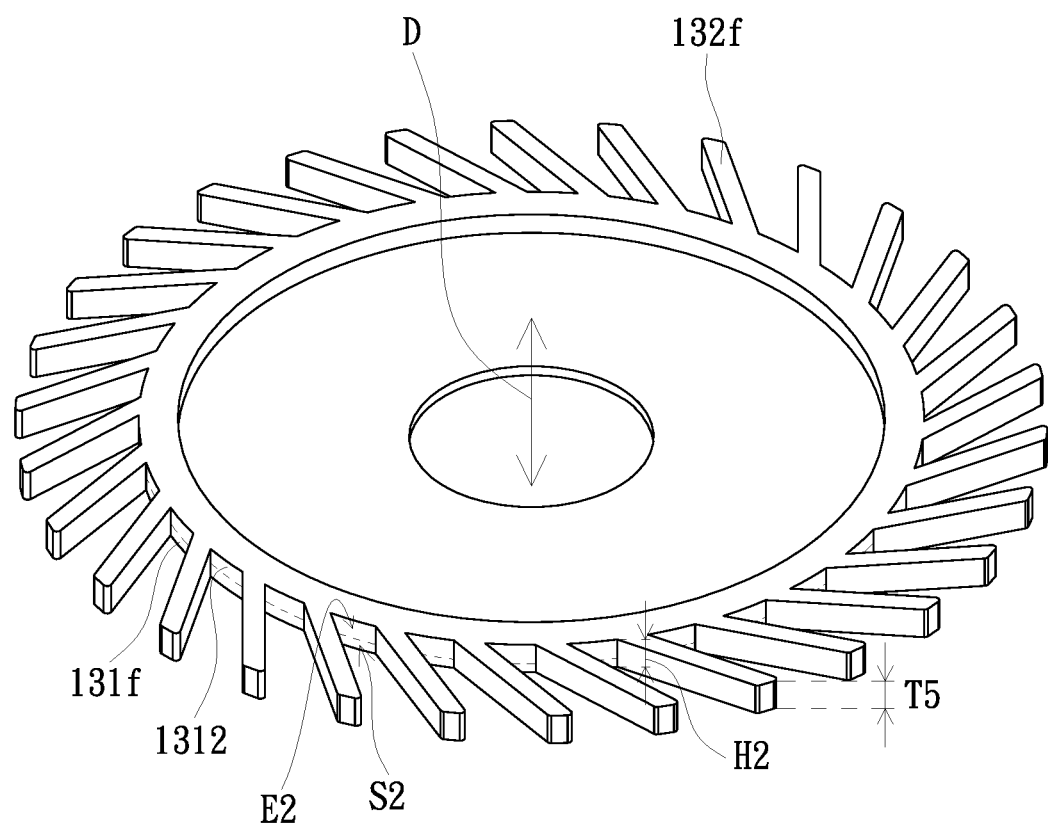
FIG. 8B is a schematic three-dimensional view of the heat dissipation member of FIG. 8A.

FIG. 8A is a schematic top view of a heat dissipation member of a wavelength conversion element according to another embodiment of the invention. FIG. 8B is a schematic three-dimensional view of the heat dissipation member of FIG. 8A. The structure and advantages of the wavelength conversion element of this embodiment are similar to those of the previous embodiments, and only the differences will be described below. Please refer to FIG. 8A first. In the heat dissipation member 130f of this embodiment, the heat dissipation tooth portion 132f can extend from the outer side surface S2 of the heat dissipation plate 131f in a predetermined direction D1. The predetermined direction D1 is inclined with respect to the radial direction of the heat dissipation plate 131f. In addition, the predetermined direction D1 is, for example, coplanar with the radial direction of the heat dissipation plate 131f. In addition, the predetermined direction D1 of the heat dissipation tooth portion 132e can be adjusted according to the rotation direction of the wavelength conversion element of this embodiment.

Please refer to FIG. 8B. Unlike the previous embodiments, the outer edge of the heat dissipation plate 131f in this embodiment may have an annular side wall 1312 that protrudes in a direction away from the supporting surface 111 (labeled in FIG. 1A), and the aforementioned direction away from the supporting surface 111 is, for example, substantially parallel to the axial direction D of the heat dissipation plate 131f. The outer side surface S2 of the heat dissipation plate 131f further includes the outer ring surface E2 of the annular side wall 1312. In other words, the outer ring surface E2 of the annular side wall 1312 is, for example, a partial outer side surface S2 of the heat dissipation plate 131f. On the other hand, each heat dissipation tooth portion 132f may have a maximum thickness T5 in the axial direction D. The maximum thickness T5 of this embodiment may be equal to the height H2 of the outer side surface S2 in the axial direction D. The maximum thickness T5 may be 0.3 mm to 1.0 mm, but is not limited thereto.

Figure 9A:
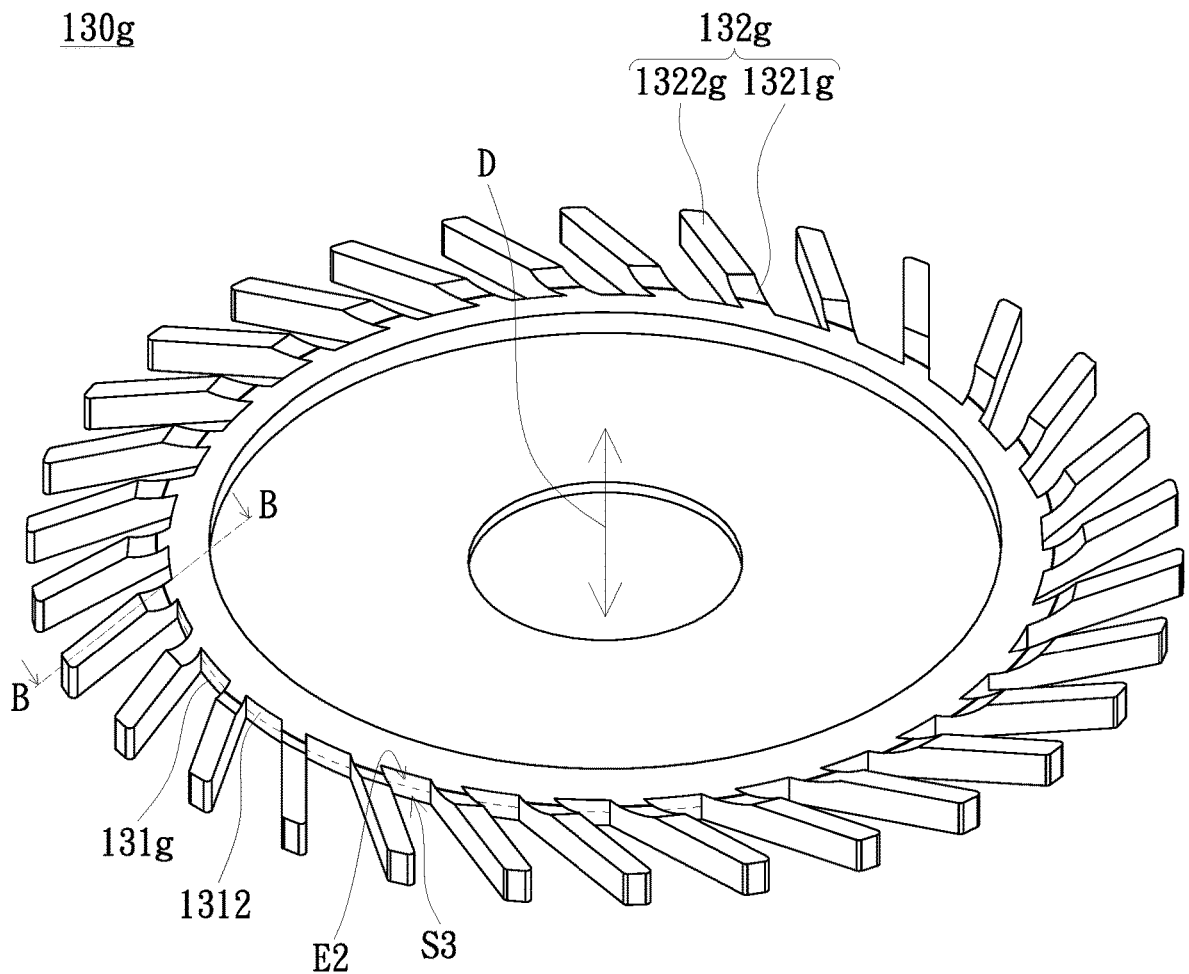
FIG. 9A is a schematic three-dimensional view of a heat dissipation member of a wavelength conversion element according to another embodiment of the invention.
Figure 9B:
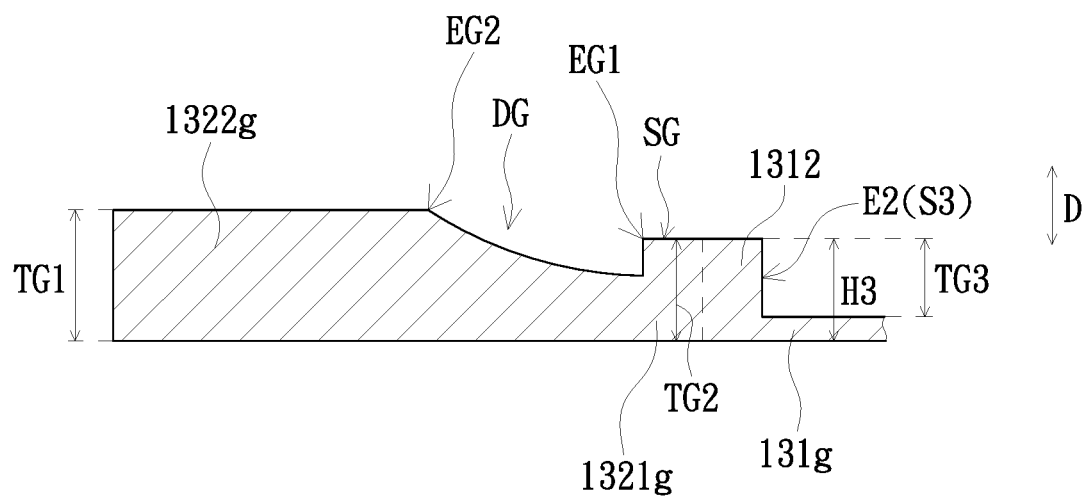
FIG. 9B is a schematic cross-sectional view of the heat dissipation member, taken along the line B-B in FIG. 9A.

FIG. 9A is a schematic three-dimensional view of a heat dissipation member of a wavelength conversion element according to another embodiment of the invention. FIG. 9B is a schematic cross-sectional view of the heat dissipation member, taken along the line B-B in FIG. 9A. Please refer to FIGS. 9A and 9B. Compared with the embodiment of FIG. 8A, each heat dissipation tooth portion 132g in this embodiment may include a first section 1321g and a second section 1322g. The first end EG1 (labeled in FIG. 9B) of the first section 1321g is connected to the outer side surface S3 of the heat dissipation plate 131g. The second end EG2 (labeled in FIG. 9B) opposite to the first end EG1 of the first section 1321g is connected to the second section 1322g. In the axial direction D of the heat dissipation plate 131g, the thickness TG1 of the second section 1322g is greater than the thickness TG2 of the first section 1321g. In addition, the outer edge of the heat dissipation plate 131g may have an annular side wall 1312 protruding in a direction away from the supporting surface 111 (labeled in FIG. 1A), and the aforementioned direction away from the supporting surface 111 is, for example, substantially parallel to the axial direction D of the heat dissipation plate 131g. The thickness TG1 of the second section 1322g may also be greater than the thickness TG3 of the annular side wall 1312 in the axial direction D. In this way, the heat dissipation area of the heat dissipation tooth portion 132g can be further increased, thereby improving the heat dissipation efficiency of the heat dissipation member 130g. In addition, the surface SG of the first section 1321g away from the supporting surface 111 (labeled in FIG. 1A) has a diversion groove DG (labeled in FIG. 9B), which can reduce the air resistance formed when the heat dissipation member 130g rotates. Incidentally, the shape of the diversion groove DG is not limited to the shape shown in FIGS. 9A and 9B. For example, in other embodiments, the diversion groove DG may be an inclined surface formed on the surface SG This embodiment does not limit the specific structure of the diversion groove DG.

Similar to the embodiment of FIG. 8B, the outer side surface S3 of the heat dissipation plate 131g in this embodiment further includes the outer ring surface E2 of the annular side wall 1312. In other words, the outer ring surface E2 of the annular side wall 1312 is, for example, a partial outer side surface S3 of the heat dissipation plate 131g. On the other hand, each heat dissipation tooth portion 132g may have a maximum thickness in the axial direction D, and the maximum thickness is, for example, the thickness TG1 of the second section 1322g. The thickness TG1 may be greater than the height H3 (labeled in FIG. 9B) of the outer side surface S3 in the axial direction D. In this embodiment, the thickness TG1 may be 0.3 mm to 1.0 mm, but is not limited thereto.

Figure 10A:
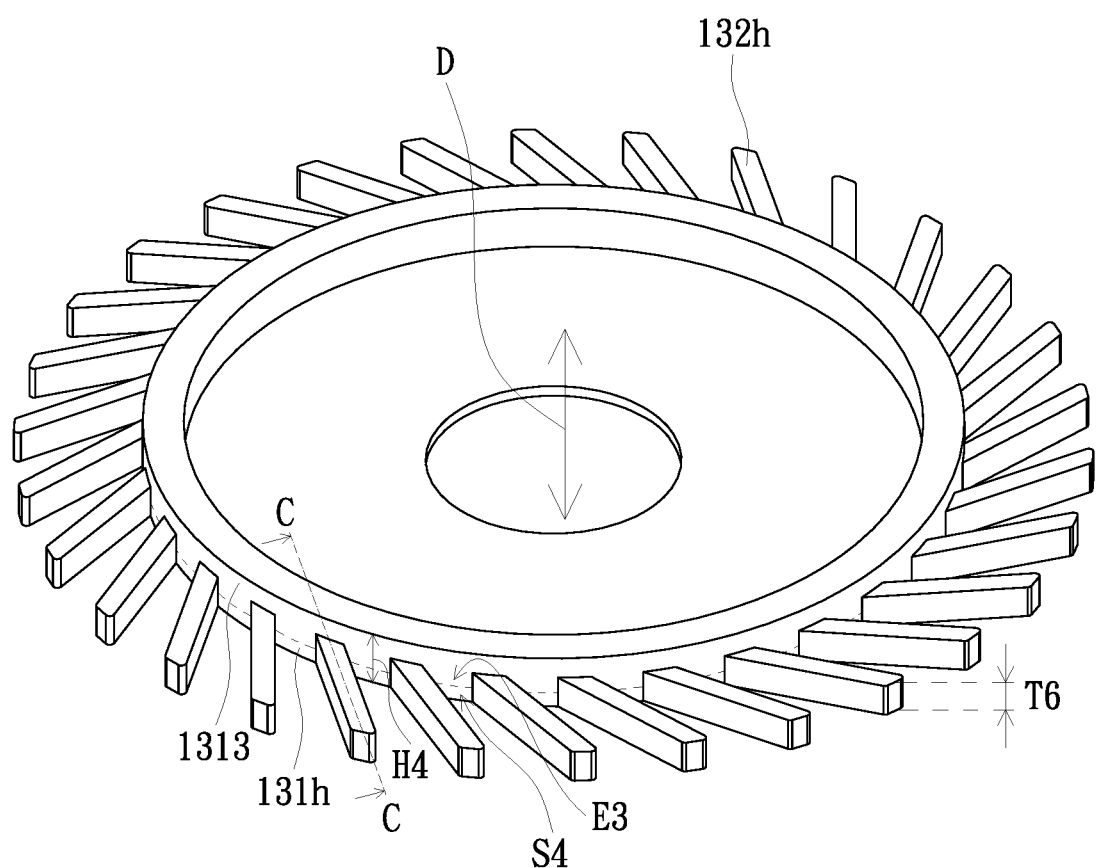
FIG. 10A is a schematic three-dimensional view of a heat dissipation member of a wavelength conversion element according to another embodiment of the invention.
Figure 10B:
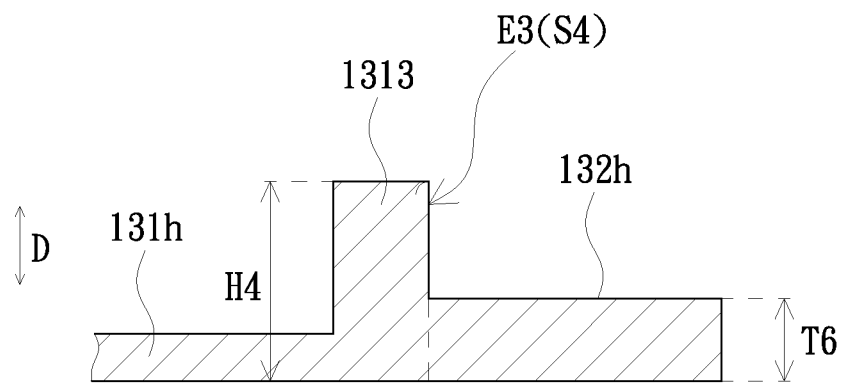
FIG. 10B is a schematic partial cross-sectional view of the heat dissipation member, taken along the line C-C in FIG. 10A.

FIG. 10A is a schematic three-dimensional view of a heat dissipation member of a wavelength conversion element according to another embodiment of the invention. FIG. 10B is a schematic partial cross-sectional view of the heat dissipation member, taken along the line C-C in FIG. 10A. The structure and advantages of the wavelength conversion element of this embodiment are similar to those of the wavelength conversion element of FIG. 8B, and only the difference will be described below. Please refer to FIGS. 10A and 10B. The outer edge of the heat dissipation plate 131h may have an annular side wall 1313 protruding in a direction away from the supporting surface 111 (labeled in FIG. 1A), and the aforementioned direction away from the supporting surface 111 is, for example, substantially parallel to the axial direction D. The outer side surface S4 of the heat dissipation plate 131h also includes the outer ring surface E3 of the annular side wall 1313. In other words, the outer ring surface E3 of the annular side wall 1313 is, for example, a partial outer side surface S4 of the heat dissipation plate 131h. On the other hand, the maximum thickness T6 of each heat dissipation tooth portion 132h in the axial direction D may be smaller than the height H4 of the outer side surface S4 in the axial direction D. The maximum thickness T6 may be 0.3 mm to 1.0 mm, but is not limited thereto.

Figure 11A:
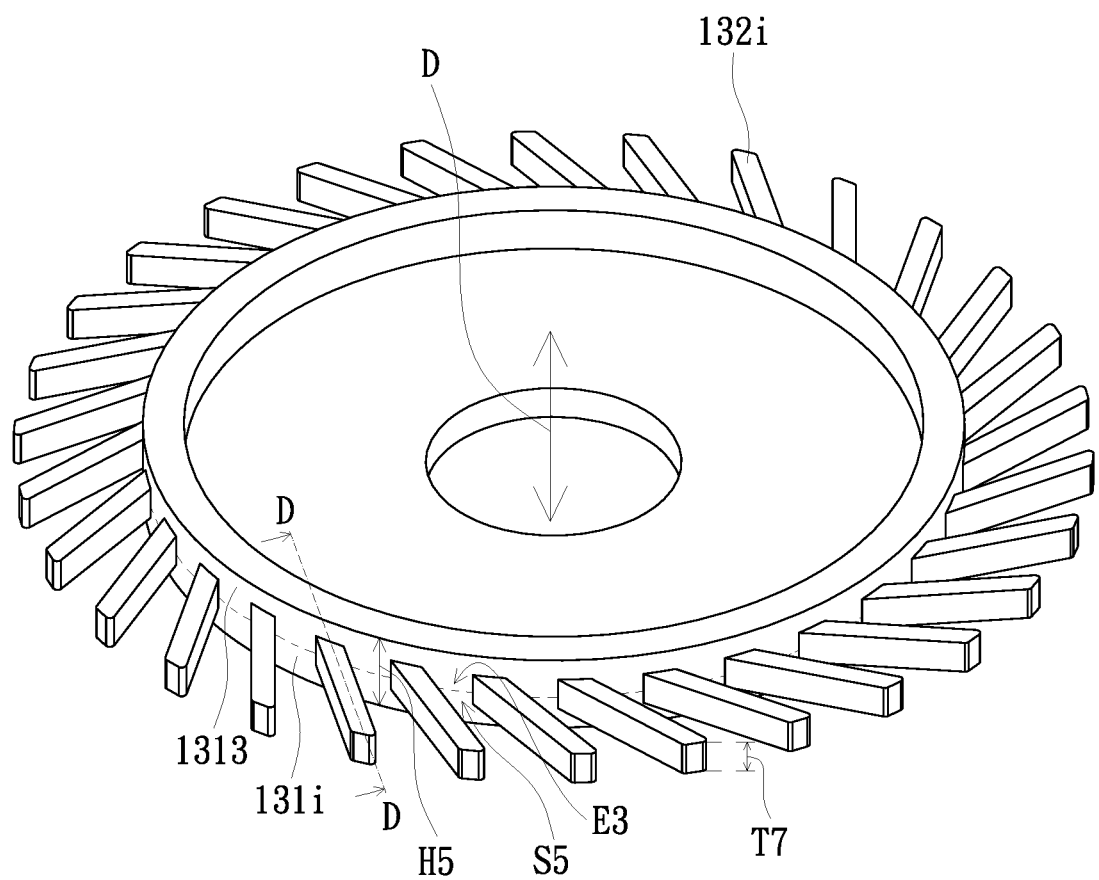
FIG. 11A is a schematic three-dimensional view of a heat dissipation member according to another embodiment of the invention.
Figure 11B:
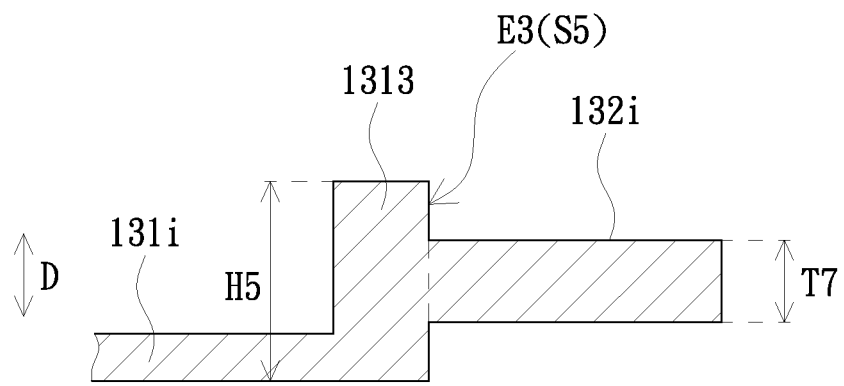
FIG. 11B is a schematic partial cross-sectional view of the heat dissipation member, taken along the line D-D in FIG. 11A.

FIG. 11A is a schematic three-dimensional view of a heat dissipation member according to another embodiment of the invention. FIG. 11B is a schematic partial cross-sectional view of the heat dissipation member, taken along the line D-D in FIG. 11A. The structure and advantages of the wavelength conversion element of this embodiment are similar to those of the wavelength conversion element of FIG. 10A, and only the difference will be described below. Please refer to FIGS. 11A and 11B. The outer edge of the heat dissipation plate 131i may have an annular side wall 1313 protruding in a direction away from the supporting surface 111 (labeled in FIG. 1A), and the aforementioned direction away from the supporting surface 111 is, for example, substantially parallel to the axial direction D in FIG. 11A. The outer side surface S5 of the heat dissipation plate 131i also includes the outer ring surface E3 of the annular side wall 1313. As shown in FIG. 11B, the outer ring surface E3 of the annular side wall 1313 is, for example, a partial outer side surface S5 of the heat dissipation plate 131i. On the other hand, the maximum thickness T7 of each heat dissipation tooth portion 132i in the axial direction D may be smaller than the height H5 of the outer side surface S5 in the axial direction D. For example, the maximum thickness T7 may be 0.3 mm to 1.0 mm, but is not limited thereto.

Figure 12:
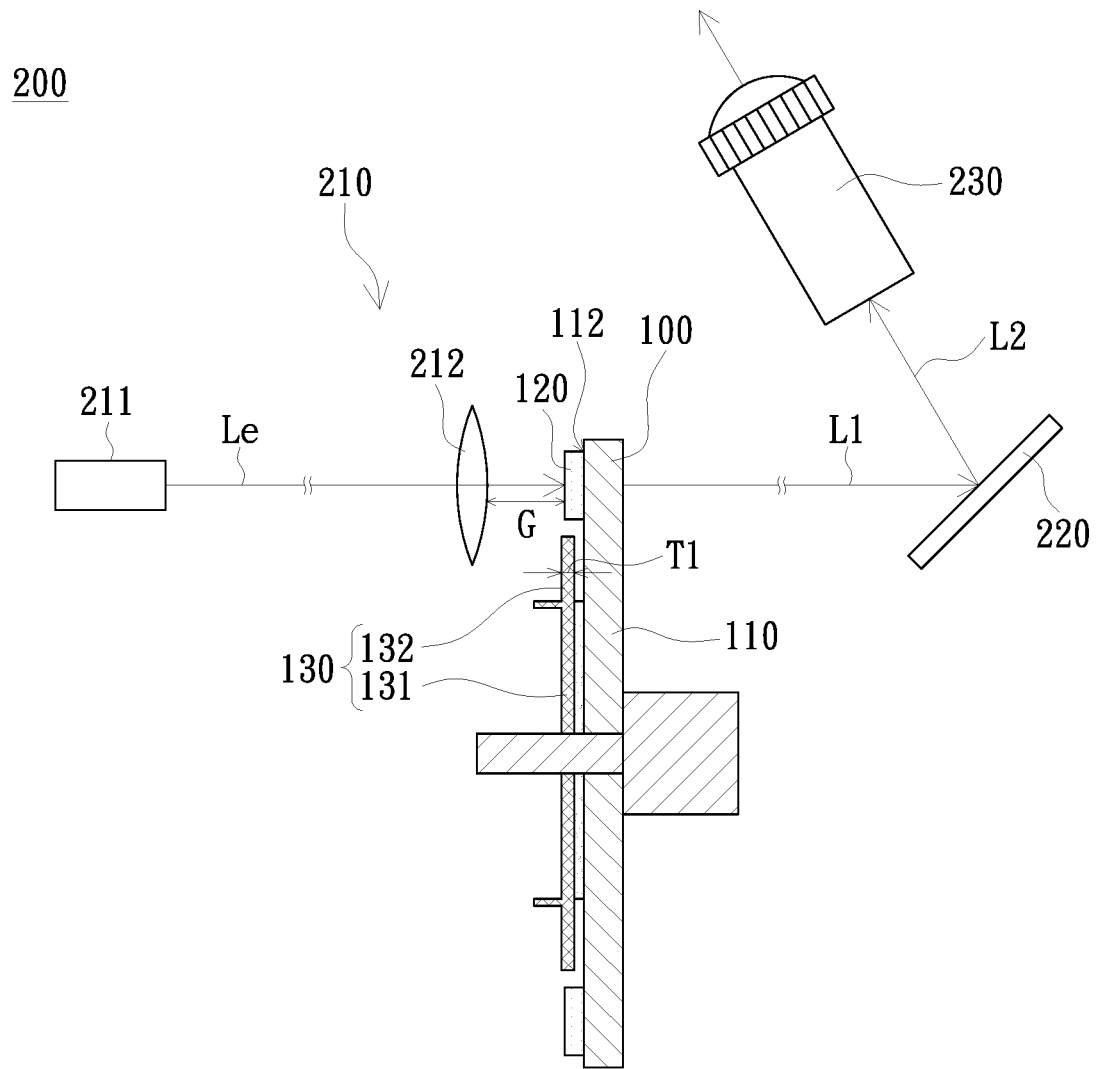
FIG. 12 is a schematic view of a projection device according to an embodiment of the invention.

FIG. 12 is a schematic view of a projection device according to an embodiment of the invention. Please refer to FIG. 12. The projection device 200 includes an illumination system 210, a light valve 220 and a projection lens 230. The illumination system 210 is used to provide an illuminating beam L1. The light valve 220 is disposed on the transmission path of the illumination beam L1 to convert the illumination beam L1 into an image beam L2. The projection lens 230 is disposed on the transmission path of the image beam L2 to project the image beam L2. The illumination system 210 includes an excitation light source 211 and the aforementioned wavelength conversion element 100, wherein the wavelength conversion element 100 can be replaced with the wavelength conversion element of any of the aforementioned embodiments. The excitation light source 211 is used to provide an excitation beam Le. The wavelength conversion element 100 is disposed on the transmission path of the excitation beam Le.

The excitation light source 211 of the illumination system 210 includes, for example, a light emitting diode (LED) or a laser diode (LD), wherein the number of the light emitting diode or laser diode may be one or more. For example, the light emitting diodes (or laser diodes) may be arranged in a matrix when the number of light emitting diodes (or laser diodes) is plural.

In addition, the illumination system 210 of this embodiment may further include a lens 212. The lens 212 is disposed on the transmission path of the excitation beam Le and is located between the excitation light source 211 and the wavelength conversion element 100. The lens 212 is, for example, a condenser lens to converge the excitation beam Le on the wavelength conversion layer 120. Limited by the element layout inside the projection device 200, the distance G between the lens 212 and the wavelength conversion layer 120 of the wavelength conversion element 100 is, for example, approximately less than or equal to 1 mm. In order to avoid interference between the lens 212 and the heat dissipation tooth portion 132, the maximum thickness T1 (as shown in FIG. 2) of the heat dissipation tooth portion 132 is 0.3 mm to 1 mm. In one embodiment, the maximum thickness T1 of the heat dissipation tooth portion 132 is, for example, 0.3 mm to 0.6 mm, so as to further avoid interference between the lens 212 and the heat dissipation tooth portion 132.

The wavelength conversion element 100 is disposed on the transmission path of the excitation beam Le. Furthermore, the wavelength conversion zone 112 and the wavelength maintenance zone 113 (labeled in FIG. 1A) are sequentially located on the transmission path of the excitation beam Le. Specifically, the wavelength conversion layer 120 converts the excitation beam Le into a converted beam (not shown) when the wavelength conversion zone 112 is located on the transmission path of the excitation beam Le; and the wavelength of the excitation beam Le is not changed by the wavelength conversion element 100 when the wavelength maintenance zone 113 is located on the transmission path of the excitation beam Le. The illumination beam L1 includes the aforementioned beam with the same wavelength and the aforementioned converted beam. Because the features of the wavelength conversion element 100 have been described in detail in the foregoing, no redundant detail is to be given herein.

In this embodiment, the light valve 220 is, for example, a digital micromirror device (DMD), but is not limited thereto. For example, the light valve 220 in other embodiments may be a liquid crystal on silicon (LCoS) or a liquid crystal display (LCD). In addition, this embodiment does not limit the number of light valves 220. For example, the projection device 200 in other embodiments may adopt a structure of a single-chip liquid crystal display panel or a three-chip liquid crystal display panel, but is not limited thereto.

The projection lens 230 of this embodiment includes, for example, one or more optical lenses, and the refractive powers of the optical lenses may be the same or different from each other. For example, the optical lens may include various non-planar lenses such as bi-concave lenses, bi-convex lenses, concave-convex lenses, convex-concave lenses, plano-convex lenses, and plano-concave lenses, or any combination of the foregoing non-planar lenses. On the other hand, the projection lens 230 may also include a flat optical lens. The invention does not limit the specific structure of the projection lens 230.

Compared with the background art, the projection device 200 of this embodiment has better wavelength conversion efficiency and reliability due to the better heat dissipation effect of the adopted wavelength conversion element 100, so the image brightness and service life of the projection device 200 are improved. In addition, the heat dissipation member 130 of this embodiment can also be replaced with the heat dissipation member 130a, 130b, 130c, 130d, 130e, 130f, 130g, 130h, or 130i described above.

In summary, in the invention, the wavelength conversion element adopts a heat dissipation member including a heat dissipation plate and a plurality of heat dissipation tooth portions. The heat dissipation plate can clamp and fix the substrate, the heat dissipation tooth portions can disturb the surrounding airflow when the wavelength conversion element rotates and then quickly dissipate the heat of the substrate and the wavelength conversion layer. Therefore, the heat dissipation member of the invention can effectively improve the heat dissipation efficiency of the wavelength conversion element, and further improve the wavelength conversion efficiency and reliability of the wavelength conversion element. In addition, the projection device of the invention has improved image brightness and service life due to the use of the above-mentioned wavelength conversion element.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first heat dissipation tooth portion, the second heat dissipation tooth portion, the first central angle, the second central angle, the first section, the second section, the first end and the second end are only used for distinguishing various elements and do not limit the number of the elements.

What is claimed is:

1. A wavelength conversion element, comprising a substrate, a wavelength conversion layer and a heat dissipation member, wherein:
   the substrate has a supporting surface;
   the wavelength conversion layer is disposed on the supporting surface; and
   the heat dissipation member is disposed on the supporting surface, the heat dissipation member has a heat dissipation plate and a plurality of heat dissipation tooth portions, the heat dissipation plate is fixed on the supporting surface, the heat dissipation plate has an outer side surface, the outer side surface is perpendicular to the supporting surface, and the heat dissipation tooth portions are respectively connected to the outer side surface, wherein the heat dissipation plate and at least part of the plurality of heat dissipation tooth portions are surrounded in a radial direction by the wavelength conversion layer.

2. The wavelength conversion element according to claim 1, wherein the outer side surface has a ring shape.

3. The wavelength conversion element according to claim 2, wherein the heat dissipation tooth portions respectively extend from the outer side surface in a predetermined direction, and the predetermined direction is inclined with respect to the radial direction of the heat dissipation plate.

4. The wavelength conversion element according to claim 2, wherein the heat dissipation tooth portions respectively extend from the outer side surface in the radial direction of the heat dissipation plate to be away from the outer side surface.

5. The wavelength conversion element according to claim 2, wherein the heat dissipation tooth portions are respectively meniscus-shaped.

6. The wavelength conversion element according to claim 2, wherein the heat dissipation tooth portions include a plurality of first heat dissipation tooth portions and a second heat dissipation tooth portion, each of the first heat dissipation tooth portions occupies a first central angle of the outer side surface, the second heat dissipation tooth portion occupies a second central angle of the outer side surface, and the second central angle is greater than the first central angle.

7. The wavelength conversion element according to claim 6, wherein the substrate has a wavelength conversion zone and a wavelength maintenance zone adjacent to each other, the wavelength conversion zone and the wavelength maintenance zone are disposed along a circular track, the wavelength conversion layer is disposed in the wavelength conversion zone, and the second heat dissipation tooth portion corresponds to a part of the wavelength conversion zone and a part of the wavelength maintenance zone.

8. The wavelength conversion element according to claim 2, wherein each of the heat dissipation tooth portions has a spoiler structure, and the spoiler structure is convex or concave along an axial direction of the heat dissipation plate.

9. The wavelength conversion element according to claim 8, wherein each of the heat dissipation tooth portions has a maximum thickness in the axial direction of the heat dissipation plate, and the maximum thickness is greater than, equal to or less than a height of the outer side surface in the axial direction.

10. The wavelength conversion element according to claim 8, wherein each of the heat dissipation tooth portions comprises a first section and a second section, a first end of the first section is connected to the outer side surface of the heat dissipation plate, a second end of the first section opposite to the first end is connected to the second section, wherein in the axial direction of the heat dissipation plate, a thickness of the second section is greater than a thickness of the first section, and a surface of the first section away from the supporting surface has a diversion groove.

11. The wavelength conversion element according to claim 2, wherein an outer edge of the heat dissipation plate has an annular side wall protruding in a direction away from the supporting surface, and the outer side surface further comprises an outer ring surface of the annular side wall.

12. The wavelength conversion element according to claim 2, wherein the heat dissipation plate has an annular side wall protruding in a direction away from the supporting surface, and an outer ring surface of the annular side wall is located at an inner side of the outer side surface of the heat dissipation plate.

13. The wavelength conversion element according to claim 1, wherein each of the heat dissipation tooth portions has a maximum thickness in a direction perpendicular to the supporting surface, and the maximum thickness is 0.3 mm to 1.0 mm.

14. The wavelength conversion element according to claim 1, wherein at least a part of a side of the heat dissipation tooth portions away from the outer side surface overlaps a part of the wavelength conversion layer.

15. The wavelength conversion element according to claim 1, further comprising an adhesive layer, disposed at least between the substrate and the heat dissipation plate.

16. The wavelength conversion element according to claim 15, wherein the adhesive layer further extends between the substrate and the heat dissipation tooth portions.

17. The wavelength conversion element according to claim 1, wherein a material of the heat dissipation member comprises metal or ceramic.

18. The wavelength conversion element according to claim 1, wherein the heat dissipation member has a shaft hole, and the shaft hole is a through hole or a blind hole.

19. A projection device, comprising an illumination system, a light valve and a projection lens, wherein the illumination system is configured to provide an illumination beam, the light valve is disposed on a transmission path of the illumination beam and is configured to convert the illumination beam into an image beam, the projection lens is disposed on a transmission path of the image beam and is configured to project the image beam, wherein the illumination system comprises an excitation light source and a wavelength conversion element, wherein:

the excitation light source is configured to provide an excitation beam; and the wavelength conversion element is disposed on a transmission path of the excitation beam, the wavelength conversion element comprises a substrate, a wavelength conversion layer and a heat dissipation member, wherein the substrate has a supporting surface, the wavelength conversion layer is disposed on the supporting surface, the wavelength conversion layer is used to convert the excitation beam into a converted beam, the illumination beam comprises the converted beam, the heat dissipation member is disposed on the supporting surface, the heat dissipation member has a heat dissipation plate and a plurality of heat dissipation tooth portions, the heat dissipation plate is fixed on the supporting surface, the heat dissipation plate has an outer side surface, the outer side surface is perpendicular to the supporting surface, and the heat dissipation tooth portions are respectively connected to the outer side surface, wherein the heat dissipation plate and at least part of the plurality of heat dissipation tooth portions are surrounded in a radial direction by the wavelength conversion layer.

20. The projection device according to claim 19, wherein the illumination system further comprises a lens, the lens is disposed on the transmission path of the excitation beam, the lens is located between the excitation light source and the wavelength conversion element, and a distance between the lens and the wavelength conversion element is less than or equal to 1 mm.

* * * * *